(12) United States Patent
Liu et al.

(10) Patent No.: US 11,988,547 B2
(45) Date of Patent: May 21, 2024

(54) TRAIN COMPARTMENT VIBRATION MONITORING METHOD AND VIBRATION SIGNAL FEATURE LIBRARY ESTABLISHMENT AND APPLICATION METHODS

(71) Applicant: CENTRAL SOUTH UNIVERSITY, Hunan (CN)

(72) Inventors: Hui Liu, Hunan (CN); Chengming Yu, Hunan (CN); Yanfei Li, Hunan (CN); Jin Qin, Hunan (CN); Lei Zhang, Hunan (CN); Shi Yin, Hunan (CN); Zhu Duan, Hunan (CN)

(73) Assignee: Central South University, Hunan (CN)

( * ) Notice: Subject to any disclaimer, the term of this patent is extended or adjusted under 35 U.S.C. 154(b) by 0 days.

(21) Appl. No.: 17/760,937

(22) PCT Filed: Jan. 4, 2021

(86) PCT No.: PCT/CN2021/070117
§ 371 (c)(1),
(2) Date: Mar. 16, 2022

(87) PCT Pub. No.: WO2022/141623
PCT Pub. Date: Jul. 7, 2022

(65) Prior Publication Data
US 2024/0044695 A1 Feb. 8, 2024

(51) Int. Cl.
*G01H 1/00* (2006.01)
*B61L 15/00* (2006.01)

(52) U.S. Cl.
CPC ............ *G01H 1/00* (2013.01); *B61L 15/0081* (2013.01)

(58) Field of Classification Search
CPC .............................. G01H 1/00; B61L 15/0081
(Continued)

(56) References Cited

U.S. PATENT DOCUMENTS

| | | | |
|---|---|---|---|
| 9,714,043 B2 * | 7/2017 | Mian | G01H 1/00 |
| 11,429,900 B1 * | 8/2022 | Alvarenga Marinelli | H04R 3/005 |
| 2014/0298099 A1 | 10/2014 | Tan et al. | |

FOREIGN PATENT DOCUMENTS

| CN | 103250107 A | 8/2013 |
|---|---|---|
| CN | 107192444 A | 9/2017 |

(Continued)

OTHER PUBLICATIONS

English abstract for CN 107192444 A (2017).
(Continued)

*Primary Examiner* — Aditya S Bhat
(74) *Attorney, Agent, or Firm* — Caesar Rivise, PC

(57) ABSTRACT

The present invention discloses a train compartment vibration monitoring method and vibration signal feature library establishment and application methods. The non-intrusive train compartment vibration monitoring method only obtains vibration signals of a main measurement point in a train compartment during actual monitoring. The method accurately and truthfully reflects the relationship between the position of a vibration source and the phase offset and amplitude attenuation, can monitor the vibration of an unknown vibration source, and can identify the abnormal vibration to provide a basis for abnormal vibration processing. The method can realize the reconstruction of vibration source signals on the basis of only measuring the vibration signals of the main measurement point, so as to realize the real-time update of multiple variable vibration signal feature library; and the multivariable vibration signal feature library can provide a data basis for vibration signal optimization decomposition, vibration signal image identification, abnormal vibration signal identification, etc.

10 Claims, 1 Drawing Sheet

(58) Field of Classification Search
USPC .......................................................... 702/56
See application file for complete search history.

(56) References Cited

FOREIGN PATENT DOCUMENTS

| CN | 108750856 A | 11/2018 |
| CN | 109353376 A | 2/2019 |
| WO | 2012088707 A1 | 7/2012 |

OTHER PUBLICATIONS

English abstract for CN 108750856 A (2018).
English abstract for CN 109353376 A (2019).
International Search Report from corresponding PCT/CN2021/070117 mailed Sep. 24, 2021.

\* cited by examiner

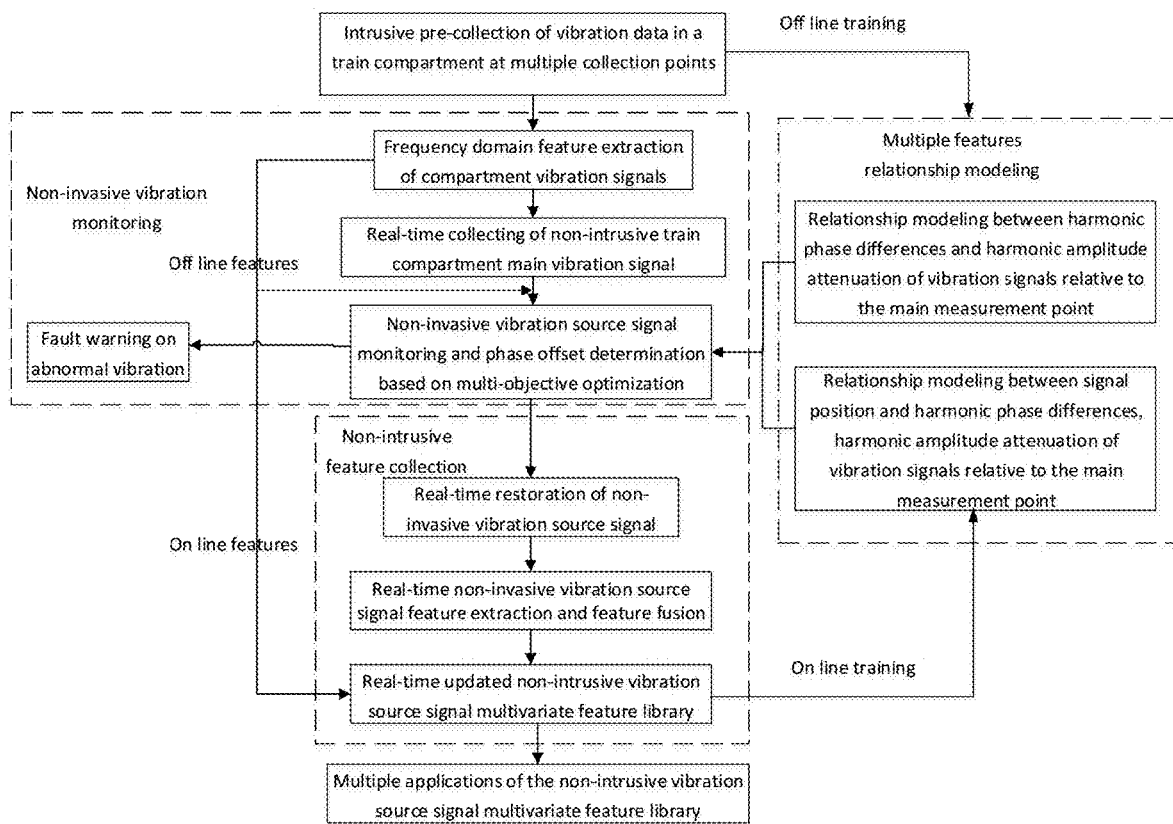

TRAIN COMPARTMENT VIBRATION MONITORING METHOD AND VIBRATION SIGNAL FEATURE LIBRARY ESTABLISHMENT AND APPLICATION METHODS

CROSS-REFERENCE TO RELATED APPLICATIONS

This application is a U.S. National Phase Application of PCT/CN2021/070117, filed Jan. 4, 2021, the content of which application is incorporated herein by reference in its entirety for all purposes.

FIELD OF THE INVENTION

The present invention belongs to the field of train compartment vibration identification technology, and particularly relates to a train compartment vibration monitoring method and vibration signal feature library establishment and application methods.

BACKGROUND OF THE INVENTION

In recent years, China's high-speed trains have continued to develop. During high-speed train operation, the interior of a train compartment will be affected by external vibration sources to produce vibration. On the one hand, the vibration of the train compartment can reflect the operating conditions of train components in contact with the train compartment. On the other hand, the vibration of the train compartment will affect passenger comfort and ride experience.

The existing real-time monitoring method for train compartment vibration has the following disadvantages:

First, sensors are installed on only key position, which cannot monitor unknown vibration sources. For example, the patent No. CN111044303A proposes a method for diagnosing abnormal vibration in a passenger compartment of a magnetic levitation train. In this method, a large number of sensors are installed in the passenger compartment of the train to monitor abnormal vibration therein. However, this patent does not involve the monitoring of unknown vibration sources.

Second, the current monitoring mode mainly includes intrusive installation of a large number of sensors in the train for direct monitoring. Although the accuracy is high, redundancy and waste of sensors will be inevitably caused. For example, the patent No. CN110879102A proposes a rail train vibration monitoring system. This system is equipped with a plurality of vibration monitoring terminals in each compartment and transmits data to a general control center in real time, which can determine whether the vibration of the compartments is abnormal. The method does not monitor the vibration source of the train, and requires more monitoring equipment such as sensors, so the cost is relatively high.

Based on the above reasons, non-intrusive vibration monitoring for train compartments and determination of abnormal vibration sources are of great significance for reducing train use and maintenance costs, ensuring train operation safety and improving passenger comfort.

SUMMARY OF THE INVENTION

In view of the above shortcomings of the prior art, the objective of the present invention is to provide a non-intrusive train compartment vibration monitoring method and vibration signal feature library establishment and application methods, which do not require a large number of sensors, but can monitor abnormal vibration of known vibration sources and unknown vibration sources of a train.

In order to solve the above technical problems, the technical solution adopted by the present invention is as follows:

A non-intrusive train compartment vibration monitoring method is characterized by including the following steps:

Step 1, under the conditions of normal vibration and abnormal vibration of known vibration sources outside a train compartment, pre-collecting vibration data M of a plurality of sub measurement points in the train compartment in transverse, longitudinal and vertical directions, pre-collecting vibration data C of a main measurement point in the train compartment in transverse, longitudinal and verticals, and pre-collecting vibration data S of each known vibration source outside the train compartment in transverse, longitudinal and vertical directions;

Step 2, extracting phase information and amplitude information of 1~J-order harmonic signals of the vibration data M of each sub measurement point, extracting phase information and amplitude information of 1~J-order harmonic signals of the vibration data C of the main measurement point, and extracting phase information and amplitude information of 1~J-order harmonic signals of each known vibration source;

Step 3, training a first model by a machine learning algorithm, with 1~-J-order harmonic phase differences and harmonic amplitude ratios between the vibration data of each non-main measurement point and the vibration data of the main measurement point as input, and position information of each non-main measurement point in the transverse, longitudinal and vertical directions relative to the main measurement point as output;

training a second model by a machine learning algorithm, with 1~J-order harmonic phase differences between the vibration data of each non-main measurement point and the vibration data of the main measurement point as input, and 1~J-order harmonic amplitude ratios between the vibration data of each non-main measurement point and the vibration data of the main measurement point as output;

wherein the non-main measurement points are composed of the sub measurement points and the known vibration sources;

Step 4, collecting real-time vibration data CR of the main measurement point in the transverse, longitudinal and vertical directions;

Step 5, setting optimization objectives with phase offsets of vibration sources relative to the main measurement point, a combined working state of the known vibration sources, and abnormal vibration types as independent variables, executing a multi-objective optimization algorithm based on the first model and the second model, and outputting vibration monitoring result information of the train compartment, the vibration monitoring result information including positions of vibration sources that are vibrating and/or abnormal vibration types of vibration sources that are vibrating and/or 1~J-order harmonic phase offsets of vibration sources that are vibrating relative to the main measurement point and/or 1~J-order harmonic amplitude ratios of vibration sources that are vibrating relative to the main measurement point.

As a preferred manner, in step 1, the normal vibration of the known vibration sources outside the train compartment includes two situations: (1) each known vibration source outside the train compartment vibrates normally, and (2) any known vibration source outside the train compartment vibrates normally alone and the rest of the known vibration sources do not vibrate.

As a preferred manner, in step 1, the abnormal vibration of the known vibration sources outside the train compartment includes two situations: (1) any known vibration source outside the train compartment vibrates abnormally alone and the rest of the known vibration sources do not vibrate, and (2) any known vibration source outside the train compartment vibrates abnormally alone and the rest of the known vibration sources vibrate normally.

As a preferred manner, in step 1, $M=[L_M,m(t)]$, $C=[L_C,c(t)]$, $S=[L_S,s(t)]$; $m(t)$ is a vibration signal value corresponding to the sub measurement point, $c(t)$ is a vibration signal value corresponding to the main measurement point, and $s(t)$ is a vibration signal value corresponding to the known vibration source: $L_M$ is a label value of corresponding vibration data of the sub measurement point and $L_{AI}=[l_M, l_t, l_g, l_d, l_{o1}]$, $L_C$ is a label value of corresponding vibration data of the main measurement point and $L_C=[l_s,l_t,l_g,l_d]$, $L_S$ is a label value of corresponding vibration data of the known vibration source and $L_S=[l_s,l_t,l_g,l_d,l_{o2}]$, $l_M$ is a number label of the sub measurement point, $l_t$ is a time stamp label, $l_g$ is an abnormal vibration type label, $l_{o1}$ is a position information label of the sub measurement point relative to the main measurement point in the transverse, longitudinal or vertical direction, $l_s$ is a label for the known vibration sources that are vibrating simultaneously, $l_d$ is a vibration direction label, $l_S$ is a number label of the known vibration source, and $l_2$ is a position information label of the known vibration source relative to the main measurement point in the transverse, longitudinal or vertical direction.

As a preferred manner, in step 5, the weighted difference between the sum of frequency domain features of vibration signals of each known vibration source and the frequency domain features of each harmonic order of vibration signals of the main measurement point is minimized as the first optimization objective; and the weighted variance of the difference between harmonic orders of vibration signals of each known vibration source is minimized as the second optimization objective.

Further, the method also includes step 6 of converting and restoring the vibration monitoring result information obtained in step 5 into real-time vibration source vibration signals in a time domain.

Based on the same inventive concept, the present invention further provides a train compartment vibration signal feature library establishment method, which is characterized by including the described non-intrusive train compartment vibration monitoring method, and further including:

Step 7: extracting frequency domain features, time domain features and image features of the real-time vibration source vibration signals, and performing feature fusion or feature reconstruction on the frequency domain features and time domain features of the real-time vibration source vibration signals;

Step 8, establishing a train compartment vibration signal feature library based on the frequency domain features, time domain features, image features, and feature fusion or feature reconstruction results obtained in step 7.

Further, the method also includes training the first model and/or the second model on line using the information in the train compartment vibration signal feature library. Based on the same inventive concept, the present invention further provides an application method of the train compartment vibration signal feature library established by the train compartment vibration signal feature library establishment method, which is characterized by including:

obtaining, by training, a relationship model between the vibration signal features in the train compartment vibration signal feature library and train service performance characterization parameters, and outputting real-time train service performance characterization parameters by using the real-time obtained vibration signal features in the train compartment vibration signal feature library as input of the relationship model during train operation.

Based on the same inventive concept, the present invention further provides an application method of the train compartment vibration signal feature library established by the train compartment vibration signal feature library establishment method, which is characterized by including:

based on time series information of the vibration signal features in the train compartment vibration signal feature library, using a time series prediction method to predict abnormal vibration of the vibration sources at a future time.

Compared with the prior art, the present invention has the following advantages:

1) The non-intrusive train compartment vibration monitoring method only needs to obtain vibration signals of the main measurement point in the train compartment during actual monitoring, which avoids sensor redundancy, saves costs, and is conducive to train lightweight.

2) The relationship between the harmonic phase offset and harmonic amplitude attenuation of the vibration signal of each sub measurement point relative to the vibration signal of the main measurement point and the relative position information is modeled, which can realize nonlinear modeling of the relationship, accurately and truly reflects the relationship between the position of the vibration source and the phase offset and amplitude attenuation, lays a foundation for non-intrusive vibration monitoring, and can monitor the vibration of unknown sources.

3) A non-intrusive train compartment vibration monitoring and vibration source location calculation method is proposed, in which a multi-objective optimization method is adopted to determine an optimal phase offset and optimal vibration signal combination, and then the position of the vibration source can be calculated through the relationship between the phase offset and the position information. The method only needs to measure the vibration signal of the main measurement point during actual monitoring, and can identify abnormal vibration of the vibration source, so as to provide a basis for abnormal vibration processing.

4) A non-invasive method for vibration source signal acquisition and real-time update of a multiple vibration signal feature library is proposed, which can reconstruct a vibration source signal by measuring only the vibration signal of the main measurement point, thereby realizing real-time update of the multiple vibration signal feature library. In addition, the multivariate vibration signal feature library can provide a data basis for the optimization and decomposition of vibration signals, vibration signal image identification, abnormal vibration signal recognition, etc.

BRIEF DESCRIPTION OF THE DRAWINGS

FIG. 1 is a flowchart of an embodiment of the present invention.

DETAILED DESCRIPTION OF THE EMBODIMENTS

During high-speed operation of a train, the interior of a train compartment will be affected by external vibration sources to produce vibration. On the one hand, the vibration of the train compartment can reflect the operating conditions of train components in contact with the train compartment. One the other hand, the vibration of the train compartment will affect passenger comfort and ride experience. Non-intrusive monitoring for train compartment vibration can provide an important support for determining train service performance and a source of abnormal vibration, and is of great significance for ensuring the safety of train operation and improving passenger comfort.

As shown in FIG. 1, the present invention includes the following steps:

Step 1, intrusive pre-collection of vibration data in a train compartment at multiple collection points The present invention needs to collect some initial training data in advance before the non-invasive vibration monitoring for the train compartment. The initial training data is collected in an intrusive way at multiple measurement points:

Step 101: first, a plurality of sub measurement points and a main measurement point are arranged in the train compartment. The arrangement rules of the sub measurement points are: for a plurality of transverse sections of the train, at least two vibration sensors for measuring transverse vibration signals of the train compartment are arranged on each transverse section; for a plurality of longitudinal sections of the train, at least two vibration sensors for measuring longitudinal vibration signals of the train compartment are arranged on each longitudinal section; and for a plurality of vertical sections of the train, at least two vibration sensors for measuring vertical vibration signals of the train compartment are arranged on each vertical section. Totally 3 vibration sensors are arranged at the main measurement point to measure transverse, longitudinal, and vertical vibration signals at the main measurement point respectively. For each known vibration source outside the train compartment, three vibration sensors are arranged at each known vibration source to measure transverse, longitudinal, and vertical vibration signals at the corresponding known vibration source.

Step 102, vibration signals of the sub measurement points and the main measurement point of the train compartment and vibration signals of the outside known vibration sources are collected during normal operation of the experimental train (that is, all known vibration sources outside the train compartment vibrate normally).

Step 103: a separate vibration experiment for each vibration source (i.e. any known vibration source outside the train compartment vibrates normally and the rest of the known vibration sources do not vibrate) and an abnormal vibration experiment for each vibration source are designed. The latter includes a separate vibration experiment of abnormal vibration of each vibration source (i.e. any known vibration source outside the train compartment vibrates abnormally alone and the rest of the known vibration sources do not vibrate) and an experiment of abnormal vibration of a single vibration source and hybrid vibration of multiple vibration sources (i.e. any known vibration source outside the train compartment vibrates abnormally alone and the rest of the known vibration sources vibrate normally), vibration signals of the sub measurement points and the main measurement point of the train compartment and vibration signals of the outside known vibration sources are collected, and the same experiment is repeated five times.

Step 104: the vibration signals obtained in steps 102 and 103 are stored to a data storage module in real time, mainly using the following data storage formats: vibration data $M=[L_M, m(t)]$ of the sub measurement points in the train compartment in transverse, longitudinal and vertical directions, vibration data $C=[L_C, c(t)]$ of the main measurement point in the train compartment in transverse, longitudinal and vertical directions, and vibration data $S=[L_S, s(t)]$ of each known vibration source outside the train compartment in transverse, longitudinal and vertical directions; m(t) is a vibration signal value corresponding to the sub measurement point, c(t) is a vibration signal value corresponding to the main measurement point, and s(t) is a vibration signal value corresponding to the known vibration source: $L_M$ is a label value of corresponding vibration data of the sub measurement point and $L=[l_M, l_t, l_g, l_d, l_{o1}]$, $L_C$ is a label value of corresponding vibration data of the main measurement point and $L_C=[l_s, l_t, l_g, l_d]$, $L_S$ is a label value of corresponding vibration data of the known vibration source and $L_S=[l_s, l_t, l_g, l_d, l_{o1}]$, $l_M$ is a number label of the sub measurement point (for distinguishing signals from different compartment measurement points), $l_t$ is a time stamp label, $l_g$ is an abnormal vibration type label (the abnormal vibration type is determined by the prior art), $l_{o1}$ is a position information label of the sub measurement point relative to the main measurement point in the transverse, longitudinal or vertical direction, $l_s$ is a label for the known vibration sources that are vibrating simultaneously (for labeling the vibration sources that are vibrating), $l_d$ is a vibration direction label (for distinguishing transverse, longitudinal or vertical vibration signals), $l_S$ is a number label of the known vibration source (for distinguishing signals from different vibration source measurement points), and $l_{o2}$ is a position information label of the known vibration source relative to the main measurement point in the transverse, longitudinal or vertical direction.

The above label values are automatically assigned according to the IDs of vibration sensors that transmit backsignals. The abnormal type labels need to be manually marked, but they will be automatically assigned after non-invasive feature collection.

Step 2, frequency domain feature extraction of compartment vibration signals: phase information and amplitude information of 1~J-order harmonic signals of the vibration data M of each sub measurement point are extracted, phase information and amplitude information of 1~J-order harmonic signals of the vibration data C of the main measurement point are extracted, and phase information and amplitude information of 1~J-order harmonic signals of each known vibration source are extracted. The details are as follows:

In order to facilitate further analysis on signals and realize non-invasive monitoring for the signals, the frequency domain features of initial training set signals need to be analyzed and extracted. The time-frequency domain features of vibration signals generated by different vibration sources are distinguishable from the features of harmonic phase offset, signal time shift and amplitude attenuation of the total vibration signal measurement point; and the signal features corresponding to different abnormal vibration conditions of the same vibration source are also unique, so the time-frequency domain analysis on signals can improve the accuracy of non-invasive monitoring and feature collection.

Fast Fourier transform (FFT) is performed on the signal values m(t), c(t) and s(t) of the main measurement point vibration signals, sub measurement point vibration signals and vibration source vibration signals of the train compartment measured in step 1, the vibration time series signal for frequency domain analysis is 5s, that is, frequency domain analysis is performed on each sample signal at an interval of 5 s to obtain 1-J-order harmonic signals $\{m_1(t), m_2(t), \ldots, m_J(t)\}$, $\{c_1(t), c_2(t), \ldots, c_J(t)\}$, $\{s_1(t), s_2(t), \ldots, s_J(t)\}$ of each vibration signal, and then amplitude information and phase information of each harmonic order of the vibration signal are obtained, i.e. mA=$\{ma_1(t), ma_2(t), \ldots, ma_J(t)\}$, cA=$\{ca_1(t), \ldots, ca_2(t), ca_J(t)\}$, sA=$\{sa_1(t), sa_2(t), \ldots, sa_J(t)\}$, mB=$\{m\varphi_1(t), m\varphi_2(t), \ldots, m\varphi_J(t)\}$, cB=$\{c\varphi_1(t), c\varphi_2(t), \ldots, c\varphi_J(t)\}$, sB=$\{s\varphi_1(t), s\varphi_2(t), \ldots, s\varphi_J(t)\}$. Where $m_J$ represents the J-order harmonic signal of the compartment measurement point signal, si represents the J-order harmonic signal of the vibration source signals, $c_J$ represents the J-order harmonic signal of a certain vibration source signal, the suffixes A and B respectively indicate an amplitude set and a phase set, and the suffixes a and φ respectively indicate an amplitude and a phase value.

Step 3, data modeling on the relationship between the harmonic phase offset and amplitude attenuation of compartment vibration signals and the positions of measurement points.

In step 3, a first model is trained by a machine learning algorithm, with 1~J-order harmonic phase differences and harmonic amplitude ratios between the vibration data of each non-main measurement point and the vibration data of the main measurement point as input, and position information of each non-main measurement point in the transverse, longitudinal and vertical directions relative to the main measurement point as output; a second model is trained by a machine learning algorithm, with 1~J-order harmonic phase differences between the vibration data of each non-main measurement point and the vibration data of the main measurement point as input, and 1~J-order harmonic amplitude ratios between the vibration data of each non-main measurement point and the vibration data of the main measurement point as output; wherein, the non-main measurement points are composed of the sub measurement points and the known vibration sources.

The details are as follows:

The present invention adopts data modeling to analyze the relationship between the phase offset, amplitude attenuation of different measurement point vibration signals and the positions of measurement points. In an ideal state, there is a definite relationship between the phase offset, amplitude attenuation and signal propagation distance of a vibration signal. However, due to the complexity of material structures of the train compartment and other reasons, traditional methods often cannot reflect the real relationship between the offset, attenuation of a signal and the position of a measurement point. Therefore, the present invention adopts data modeling to analyze this relationship.

Step 301: harmonic phase differences $\Delta\varphi_{ki}$, harmonic amplitude ratios $u_{ki}$ between non-main measurement point signals (including compartment sub measurement point vibration signals and known vibration source signals) and main measurement point vibration signals, and a position relationship $l_o$ between a non-measurement point signal and a main measurement point signal are calculated, where k represents a signal k, and i represents the order of a harmonic. Measurement point harmonic phase differences measured multiple times are averaged, to obtain each harmonic order of harmonic phase difference $$\Delta\varphi_i = \frac{1}{n}\sum_{k=1}^{n}\Delta\varphi_{ki}$$

and harmonic amplitude ratio $$u_i = \frac{1}{n}\sum_{k=1}^{n}u_{ki}$$

of each sub measurement point or known vibration source relative to the main measurement point vibration signal.

Step 302, data modeling of harmonic phase difference, harmonic amplitude ratio-main measurement point relative position relationship (1) Harmonic phase difference and harmonic amplitude ratio data of transverse, longitudinal, and vertical sub measurement points and vibration source measurement points relative to the main measurement point and position relationship data thereof relative to the main measurement point are read, 80% of the data set is used as a training set and 20% is used as a test set.

(2) The harmonic phase difference and harmonic amplitude ratio of each non-main measurement point signal relative to the main measurement point signal are taken as input, $I_k=[\Delta\varphi_k, u_k]$, I=$[I_1, I_2, \ldots I_k]$, and the position of each non-main measurement point relative to the main measurement point is taken as output O=$[l_{o1}, l_{o2}, \ldots l_{ok}]$.

(3) A deep echo state network is used to model and describe the harmonic phase difference and harmonic amplitude ratio of each non-main measurement point signal relative to the main measurement point signal, and the position information of each non-main measurement point relative to the main measurement point. The parameter settings of the deep echo state network are as follows: the number of nodes in a reservoir is set to 10, and 10-fold cross validation is used to adaptively determine the number of layers and the matrix spectrum radius of the reservoir within ranges [1,2,3, . . . , 10] and [0.1,0.2, . . . , 0.9]. Parameters that can accurately reflect the above relationship are selected, and finally construct non-linear relationship models between the harmonic phase difference, harmonic amplitude ratio of each non-main measurement point and the position information of each non-main measurement point relative to the main measurement point. $f_{1z}(I)$, $f_{1h}(I)$, and $f_{1c}(I)$ respectively indicating longitudinal, transverse, and vertical vibration signal relationship models.

Step 303, data modeling on the relationship between the harmonic phase difference and harmonic amplitude ratio of each non-main measurement point signal.

(1) Harmonic phase difference and harmonic amplitude ratio data of transverse, longitudinal, and vertical sub measurement points and vibration source measurement points relative to the main measurement point are read, 80% of the data set is used as a training set and 20% is used as a test set.

(2) The harmonic phase difference of each non-main measurement point signal relative to the main measurement point signal is taken as input, $I_k=[\Delta\varphi_k, u_k]$, $I=[I_1, I_2, \ldots I_k]$, and the harmonic amplitude ratio of each non-main measurement point relative to the main measurement point is taken as output $O=[u_1, u_2, \ldots u_k]$.

(3) A deep echo state network is used to model and describe the harmonic phase difference and harmonic amplitude ratio relationship of each non-main measurement point signal relative to the main measurement point signal. The parameter settings of the deep echo state network are as follows: the number of nodes in a reservoir is set to 10, and 10-fold cross validation is used to adaptively determine the number of layers and the matrix spectrum radius of the reservoir within ranges $[1,2,3, \ldots, 10]$ and $[0.1, 0.2, \ldots, 0.9]$. Parameters that can accurately reflect the above relationship are selected, and finally construct relationship models in longitudinal, transverse, and vertical directions between the harmonic phase difference and harmonic amplitude ratio of each non-main measurement point vibration signal relative to the main measurement point vibration signal. $f_{2z}(I)$, $f_{2h}(I)$, and $f_{2c}(I)$, respectively indicating longitudinal, transverse, and vertical vibration signal relationship models.

Step 304, steps 302 and 303 are repeated J times according to the harmonic order to obtain corresponding relationship models of each harmonic order of the vibration signals.

Step 4, non-intrusive collection of real-time vibration data CR of the main measurement point of the train compartment in transverse, longitudinal, and vertical directions.

During high-speed train operation, main measurement point vibration sensors in transverse, longitudinal, and vertical directions are installed only at the main measurement point inside the train compartment, main measurement point vibration signals in the three directions are collected in real time, and time stamps are recorded. The real-time collected data are transmitted to the data storage module in 4G mode at an interval of 1 minute.

Step 5, non-invasive vibration source signal monitoring and phase offset determination based on multi-objective optimization phasor decomposition.

Step 5 specifically includes:

Step 501, a multi-objective grey wolf optimizer is selected to construct vibration source signals and phase offset determination models thereof, a multi-objective optimization method is selected and corresponding hyper-parameters are determined by using a multi-objective particle swarm optimization model, such as the maximum number of iterations 50, the number of grey wolves is 100, and the number of archives is 50. The model feature library only uses the feature library composed of the frequency domain features of the vibration source vibration signals.

Step 502, the optimization variables are different vibration sources and abnormal vibration types.

(1) The independent variables mainly include: a phase offset of a vibration source relative to the main measurement point, a combined working state of known vibration sources, and abnormal vibration types. Among them, the phase offset of the vibration source relative to the main measurement point is a continuous independent variable for optimizing an appropriate phase, and the combined working state of known vibration sources and the abnormal vibration types are discrete independent variables for optimizing appropriate vibration source signal sources and abnormal vibration types. The independent variables can be expressed as: $X=[D, (\Delta\varphi_1, \Delta\varphi_2, \ldots, \Delta\varphi_D, \ldots, \Delta\varphi_D), (l_{c1}, l_{c2}, \ldots), (l_{g1}, l_{g2}, \ldots)]$, where D is used to limit the number of vibration sources, and $\Delta\varphi$ represents the phase offset;

(2) The corresponding continuous independent variable is:

$$x=[d,(\Delta\varphi_1,\Delta\varphi_2, \ldots, \Delta\varphi_k, \ldots, \Delta\varphi_D),(L_{c1}, L_{c2}, \ldots),(L_{g1},L_{g2} \ldots)]$$

Where $d \in [0.5, z+0.5)$, $Lc_i \in (0,1)$, $Lg_i \in (0,1)$, and $D=[d+1/2]$, $lc_i=[Lc_i]$, $lg_i=[Lg_i]$, that is, D is up rounding of d, $lc_i$ and $lg_i$ are round-off of $Lc_i$ and Lgi respectively, and d, $lc_i$ and $lg_i$ do not have other special meanings.

Step 503: a harmonic amplitude ratio $u_i$ of a main measurement point part corresponding to each vibration source signal is calculated according to the phase offset in the independent variables by using the relationship models $f_{2z}(I)$, $f_{2h}(I)$, and $f_{2c}(I)$, obtained in step 303, of the harmonic phase offset and harmonic amplitude ratio of each non-main measurement point vibration signal relative to the main measurement point vibration signal in the longitudinal, transverse, and vertical directions, and then a harmonic phasor $\dot{F}_{Mij}$ corresponding to each vibration source signal is obtained:

$$u_{ij}=f_2(\Delta\varphi), \dot{F}_{Mij}=(u_{ij}A_{Mij}, \varphi_{ij}+\Delta\varphi_{ij})$$

Where $\dot{F}_{Mij}$ represents the j-order harmonic phasor of the vibration signal generated by the i-th vibration source signal at the main measurement point in the pre-collected data feature library, and this phasor is a vector composed of variable amplitude, phase and phase offset of the vibration source signal.

Step 504: optimization objectives are set: the weighted difference between the sum of frequency domain features of vibration signals of each known vibration source and the frequency domain features of each harmonic order of vibration signals of the main measurement point is minimized as the first optimization objective; and the weighted variance of the difference between harmonic orders of vibration signals of each known vibration source is minimized as the second optimization objective. The optimization objective function is as follows:

$$\min F_1 = \sum_j w_j \cdot \frac{\left|\dot{F}_{CRj} - \sum_{i=1}^{a}\dot{F}_{Mij}\right|}{\left|\dot{F}_{CRj}\right|}$$

$$\min F_2 = \sqrt{\sum_j \left(\frac{\left|\dot{F}_{CRj} - \sum_{i=1}^{a}\dot{F}_{Mij}\right|}{\left|\dot{F}_{CRj}\right|} - \frac{1}{16}\sum_j \frac{\left|\dot{F}_{CRj} - \sum_{i=1}^{a}\dot{F}_{Mij}\right|}{\left|\dot{F}_{CRj}\right|}\right)^2}$$

Where, $F_1$ and $F_2$ represent two objective functions, $w_j$ is the weight of each order of harmonic, $\dot{F}_{CRj}$ represents the j-order harmonic phasor value of the real-time main measurement point signal, and the phasor is composed of corresponding amplitude and phase; a is a total number of known vibration sources.

Step 505, multi-objective grey wolf optimization is performed on the independent variables, optimization function values of all search results are calculated, and non-dominated solutions are selected and saved in a file.

Step 506, the search path is updated to generate a new independent variable solution.

Step 507, the number of searches It=It+1, if It is less than the maximum number of iterations, step 504 is performed;

otherwise, the multi-objective optimization algorithm ends, and the non-dominated solution set NS in the final file is outputted.

Step 508, the independent variables that minimize the objective function in the non-dominated solution set are selected as a final solution.

Step 509, according to the selected optimal vibration source combination and the optimal phase offset, step 503 is performed to obtain a corresponding harmonic amplitude ratio; the optimal phase offset and the corresponding harmonic amplitude ratio is used as input, and the models $f_{1z}(I), f_{1h}(I)$, and $f_{1c}(I)$, trained in step 402, of the harmonic phase difference and harmonic amplitude ratio of each non-main measurement point signal and the main measurement point signal and the position relationship between the non-main measurement point signal and the main measurement point are applied to obtain the positions of vibration sources that are vibrating.

Step 5010, vibration monitoring result information of the train compartment is outputted, the vibration monitoring result information including positions of vibration sources that are vibrating and/or abnormal vibration types of vibration sources that are vibrating and/or 1~J-order harmonic phase offsets of vibration sources that are vibrating relative to the main measurement point and/or 1~J-order harmonic amplitude ratios of vibration sources that are vibrating relative to the main measurement point.

Step 5011, corresponding vibration reduction measures are taken according to the obtained abnormal vibration positions to meet the comfort requirements of passengers; and corresponding fault warning measures are taken to avoid fault.

Step 6, real-time non-invasive time-domain restoration of vibration source signals, that is, the vibration monitoring result information obtained in step 5 is converted and restored into real-time vibration source vibration signals in the time domain.

Step 601, based on the optimization results in step 5, each vibration source signal is restored using the harmonic phase offset and harmonic amplitude ratio. First, a frequency domain signal f of the corresponding vibration source in the pre-collected data feature library is extracted, and a pre-collected vibration source signal is corrected according to the following formula to obtain a real-time vibration source frequency domain signal:

$$A_{sr} = \frac{u_{so} A_{so}}{u_{sr}}, \varphi_{sr} = \varphi_{so} + \Delta\varphi_{so} - \Delta\varphi_{sr}$$

Where, $A_{sr}$ and $\varphi_{sr}$ represent the frequency domain amplitude and harmonic phase of a real-time signal, $A_{so}$ and $\varphi_{so}$ represent the frequency domain amplitude and harmonic phase of a pre-collected vibration source signal, $u_{so}$ and $\Delta\varphi_{so}$ represent the harmonic amplitude ratio and harmonic phase offset of the pre-collected vibration source signal relative to the main measurement point, $u_{sr}$ and $\Delta\varphi_{sr}$ represent the optimal harmonic phase offset and harmonic amplitude ratio obtained by optimization. During the correction process of the frequency domain signal, the amplitude near each harmonic is corrected using the harmonic amplitude ratio corresponding to the harmonic. Finally, a real-time vibration source signal s(f) can be obtained.

Step 602, inverse Fourier transform is performed on the frequency domain values of the real-time vibration signals by using IFFT technology, to obtain real-time vibration source signals in the time domain, s(t)=IFFT(s(f)).

Step 7, real-time non-invasive vibration source signal feature extraction and feature fusion or reconstruction.

Step 701: feature extraction of real-time vibration signals.

(1) Signal frequency domain feature extraction: the frequency domain feature extraction method mentioned in step 2 is repeated for the real-time vibration source signals obtained in step 6, to extract frequency domain features thereof.

(2) Signal time domain feature extraction: time domain features of the real-time vibration source signals, such as maximum amplitude, time offset, and 5 s average, are extracted.

(3) Signal image feature extraction: features are extracted from time domain and frequency domain images of the real-time vibration source signals to obtain image features.

Step 702: feature fusion of real-time vibration signals.

The time domain and frequency domain features are fused or reconstructed by a kernel principal component analysis (KPCA) method. The kernel function uses a Gaussian kernel. During feature fusion process, cumulative contribution rates of the features are calculated, and the features with cumulative contribution rates greater than 95% are taken as feature fusion results. 10-fold cross validation is performed on all feature data to determine the number of optimal features.

Step 8, establishment of a non-intrusive real-time updated multivariate feature library of train compartment vibration signals.

Based on the signal features extracted in step 7, a multivariate feature library is established according to the applicable methods of the features and the characteristics of the features:

(1) Establishment of a Non-Intrusive Vibration Signal Optimization Decomposition Feature Library.

Among the real-time vibration source signal features obtained in the above steps, the frequency domain features include harmonic phasor, harmonic amplitude, harmonic phase offset, harmonic amplitude ratio, etc., which can further enrich the vibration source signal frequency domain feature library. The features are stored into the data storage module according to the data format in step 2, to complete real-time update and supplement of the non-intrusive vibration signal multi-objective optimization decomposition feature library. This feature library can be reused to the non-intrusive vibration monitoring.

(2) Establishment of a Non-Intrusive Vibration Signal Identification Feature Library.

A real-time updated non-intrusive vibration signal identification feature library can be established according to the real-time vibration source signal features of different positions obtained in the above steps, including frequency domain features, time domain features, and fusion features, and the feature library can be applied to an artificial intelligence algorithm for the identification of vibration signals from different sources.

(3) Establishment of a Non-Intrusive Abnormal Vibration Signal Identification Feature Library.

According to the different real-time vibration source signal features obtained in the above steps, the abnormal vibration signal features therein are designated and collected, to establish a real-time updated non-invasive abnormal vibration signal identification feature library.

(4) Establishment of a Non-Invasive Real-Time Updated Train Compartment Vibration Image Identification Feature Database.

The deep learning algorithm based on image learning can identify the vibration features more accurately, and a huge train compartment vibration source image feature library can be constructed according to the real-time non-invasive collected vibration source signals, to lay a foundation for the application of artificial intelligence image identification methods.

(5) Establishment of a Non-Invasive Real-Time Updated Train Compartment Vibration Fusion Feature and Reconstruction Feature Database.

Fusion features of vibration source signals can be obtained according to the feature fusion and feature reconstruction method in step 7. The fusion features have more obvious effects during vibration signal identification. The establishment of a non-invasive train compartment vibration signal fusion feature library is conductive to promoting the application of artificial intelligence algorithms in this field.

Step 9, multiple applications of the non-invasive real-time train vibration source signal multi-feature library.

(1) Real-Time Evaluation on the Service Performance of Train Components.

A relationship model between vibration signal features in the train compartment vibration signal feature library and train service performance characterization parameters is established by using experimental data. The model can be established by a support vector machine, an extreme learning machine, an artificial neural network, a long short-term deep neural network, etc. During train operation, the vibration signal features in the train compartment vibration signal feature library obtained in step 8 are used as input of the relationship model, to output real-time train service performance characterization parameters, which can realize real-time evaluation of the service performance of train components.

(2) Fault Prediction of Train Components.

Based on the time series information of vibration signal features in the train compartment vibration signal feature library established in step 8, abnormal vibration of the vibration sources at a future time is predicted by using a common time series prediction method, which can realize train component fault prediction on the minute level during train operation and is helpful for real-time control of train safety performance.

The embodiments of the present invention are described above with reference to the accompanying drawings, but the present invention is not limited to the above specific embodiments. The above specific embodiments are only illustrative but not restrictive. Those of ordinary skill in the art can make many forms under the enlightenment of the present invention without departing from the purpose of the present invention and the protection scope of the claims, and these forms all fall within the protection scope of the present invention.

The invention claimed is:

1. A non-intrusive train compartment vibration monitoring method, comprising the following steps:
step 1, under the conditions of normal vibration and abnormal vibration of known vibration sources outside a train compartment, pre-collecting vibration data M of a plurality of sub measurement points in the train compartment in transverse, longitudinal and vertical directions, pre-collecting vibration data C of a main measurement point in the train compartment in transverse, longitudinal and verticals, and pre-collecting vibration data S of each known vibration source outside the train compartment in transverse, longitudinal and vertical directions;
step 2, extracting phase information and amplitude information of 1~J-order harmonic signals of the vibration data M of each sub measurement point, extracting phase information and amplitude information of 1~-J-order harmonic signals of the vibration data C of the main measurement point, and extracting phase information and amplitude information of 1~J-order harmonic signals of each known vibration source;
step 3, training a first model by a machine learning algorithm, with 1~J-order harmonic phase differences and harmonic amplitude ratios between the vibration data of each non-main measurement point and the vibration data of the main measurement point as input, and position information of each non-main measurement point in the transverse, longitudinal and vertical directions relative to the main measurement point as output;
training a second model by a machine learning algorithm, with 1~J-order harmonic phase differences between the vibration data of each non-main measurement point and the vibration data of the main measurement point as input, and 1~J-order harmonic amplitude ratios between the vibration data of each non-main measurement point and the vibration data of the main measurement point as output;
wherein the non-main measurement points are composed of the sub measurement points and the known vibration sources;
step 4, collecting real-time vibration data CR of the main measurement point in the transverse, longitudinal and vertical directions;
step 5, setting optimization objectives with phase offsets of vibration sources relative to the main measurement point, a combined working state of the known vibration sources, and abnormal vibration types as independent variables, executing a multi-objective optimization algorithm based on the first model and the second model, and outputting vibration monitoring result information of the train compartment, the vibration monitoring result information including positions of vibration sources that are vibrating and/or abnormal vibration types of vibration sources that are vibrating and/or 1~J-order harmonic phase offsets of vibration sources that are vibrating relative to the main measurement point and/or 1~J-order harmonic amplitude ratios of vibration sources that are vibrating relative to the main measurement point.

2. The non-intrusive train compartment vibration monitoring method of claim 1, wherein in step 1, the normal vibration of the known vibration sources outside the train compartment comprise two situations: (1) each known vibration source outside the train compartment vibrates normally, and (2) any known vibration source outside the train compartment vibrates normally alone and the rest of the known vibration sources do not vibrate.

3. The non-intrusive train compartment vibration monitoring method of claim 1, wherein in step 1, the abnormal vibration of the known vibration sources outside the train compartment comprise two situations: (1) any known vibration source outside the train compartment vibrates abnormally alone and the rest of the known vibration sources do not vibrate, and (2) any known vibration source outside the train compartment vibrates abnormally alone and the rest of the known vibration sources vibrate normally.

4. The non-intrusive train compartment vibration monitoring method of claim 1, wherein in step 1, $M=[L_M,m(t)]$, $C=[L_C,c(t)]$, $S=[L_S,s(t)]$; m(t) is a vibration signal value corresponding to the sub measurement point, c(t) is a vibration signal value corresponding to the main measurement point, and s(t) is a vibration signal value corresponding to the known vibration source: $L_M$ is a label value of corresponding vibration data of the sub measurement point and $L_M=[l_M,l_t,l_g,l_d,l_{o1}]$, $L_C$ is a label value of corresponding vibration data of the main measurement point and $L_C=[l_s, l_t,l_g,l_d]$, $L_S$ is a label value of corresponding vibration data of the known vibration source and $L_S=[l_s,l_t,l_g,l_d,l_{o2}]$, $l_M$ is a number label of the sub measurement point, $l_t$ is a time stamp label, $l_g$ is an abnormal vibration type label, $l_{o1}$ is a position information label of the sub measurement point relative to the main measurement point in the transverse, longitudinal or vertical direction, $l_s$ is a label for the known vibration sources that are vibrating simultaneously, $l_d$ is a vibration direction label, $l_s$ is a number label of the known vibration source, and $l_{o2}$ is a position information label of the known vibration source relative to the main measurement point in the transverse, longitudinal or vertical direction.

5. The non-intrusive train compartment vibration monitoring method of claim 4, wherein in step 5, the weighted difference between the sum of frequency domain features of vibration signals of each known vibration source and the frequency domain features of each harmonic order of vibration signals of the main measurement point is minimized as the first optimization objective; and the weighted variance of the difference between harmonic orders of vibration signals of each known vibration source is minimized as the second optimization objective.

6. The non-intrusive train compartment vibration monitoring method of claim 1, further comprising step 6 of converting and restoring the vibration monitoring result information obtained in step 5 into real-time vibration source vibration signals in a time domain.

7. A train compartment vibration signal feature library establishment method, comprising the non-intrusive train compartment vibration monitoring method of claim 6, and further comprising:

step 7: extracting frequency domain features, time domain features and image features of the real-time vibration source vibration signals, and performing feature fusion or feature reconstruction on the frequency domain features and time domain features of the real-time vibration source vibration signals; and step 8, establishing a train compartment vibration signal feature library based on the frequency domain features, time domain features, image features, and feature fusion or feature reconstruction results obtained in step 7.

8. The train compartment vibration signal feature library establishment method of claim 7, further comprising training the first model and/or the second model on line using the information in the train compartment vibration signal feature library.

9. An application method of the train compartment vibration signal feature library established by the train compartment vibration signal feature library establishment method of claim 7, comprising:

obtaining, by training, a relationship model between the vibration signal features in the train compartment vibration signal feature library and train service performance characterization parameters, and outputting real-time train service performance characterization parameters by using the real-time obtained vibration signal features in the train compartment vibration signal feature library as input of the relationship model during train operation.

10. An application method of the train compartment vibration signal feature library established by the train compartment vibration signal feature library establishment method of claim 7, comprising: based on time series information of the vibration signal features in the train compartment vibration signal feature library, using a time series prediction method to predict abnormal vibration of the vibration sources at a future time.

* * * * *